A. HANSS.
TIDAL HYDRAULIC POWER PLANT.
APPLICATION FILED SEPT. 14, 1910.

986,821.

Patented Mar. 14, 1911.

Witnesses:
Carrie A. Krey
Jas. E. Hutchinson

Inventor:
August Hanss,
by Bacon Milans, Attys.

UNITED STATES PATENT OFFICE.

AUGUST HANSS, OF BERLIN, GERMANY.

TIDAL HYDRAULIC-POWER PLANT.

986,821.              Specification of Letters Patent.    Patented Mar. 14, 1911.

Application filed September 14, 1910.   Serial No. 581,999.

*To all whom it may concern:*

Be it known that I, AUGUST HANSS, a subject of the German Emperor, and residing at Berlin, Germany, have invented certain new and useful Improvements in Tidal Hydraulic-Power Plants, of which the following is a specification.

My invention relates to tidal hydraulic power plants for continuously utilizing the flow and ebb of the oceans and waters connected therewith.

It is well-known to insert a prime mover, generally a turbine, between an upper and a lower basin for utilizing flood and ebb as motive force. The upper basin has been used for receiving driving water during the flow of the tide and the lower for collecting the water which is discharged therefrom. Frequently, an additional auxiliary basin has been arranged beside the two basins, generally for the purpose of storing driving water and guaranteeing uninterrupted operation in the event of the water supplied by the flood not sufficing. Auxiliary basins have also been employed, for the purpose of increasing at low water the small difference of height between the water-levels in the upper and lower basins, by the water of the lower basin being shared, according to the law of communicating tubes, by the auxiliary basin by means of a tube opening into the bottom of the lower basin.

Now a primary object of my invention is to provide that a constant head is obtained with abnormal conditions of the tide, for example when there is a strong sea wind, and also during the semimonthly inequality when the flood remains longer than usual at the highest level. For if no suitable provision be made, so much water will collect in the lower basin that the water for the prime mover is dammed back and the efficiency is diminished, the prime mover becomes flooded, and the working of the plant is disturbed. To this end I arrange that water is supplied automatically to the auxiliary basin through tubes from the highest point in the lower basin up to which the waste water may rise without damage being done. But this water collected in the auxiliary basin is not employed again as driving water, as was usual when auxiliary basins were employed heretofore, but is run off in due course into the sea.

One illustrative embodiment of my invention is represented by way of example in the accompanying drawing, wherein:—

Figure 1:
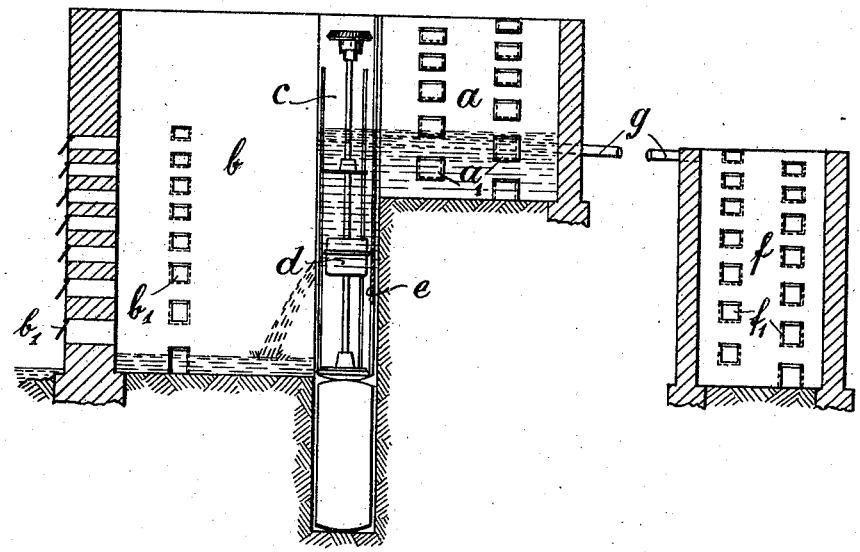
Figure 2:
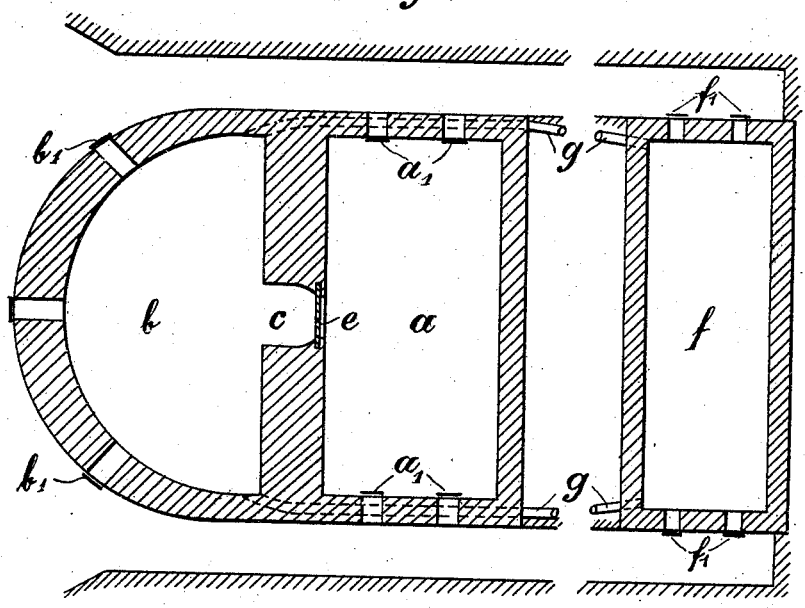

Figure 1 is a longitudinal sectional elevation showing the entire plant comprising the turbine, and Fig. 2 is a sectional plan of the plant comprising at each side a sluice serving as inflow and outflow culvert.

Referring to the drawing, my hydraulic plant comprises the upper basin or reservoir $a$ and the lower basin $b$ whose bottom is located lower than the bottom of the basin $a$ a distance equal to the working head. Between the two basins is a shaft or flume $c$ open toward the basin $b$, and a turbine $d$ which is varied in height by means of a lifting device driven in the manner of a lift corresponding to the rise and fall of the water-level in the basin $a$ is built into this shaft. A gate $e$ which can be opened corresponding to the water required for the turbine allows water to flow from the basin $a$ into the basin $b$. When the flood begins the rising water closes in front of it the valves $b_1$ of the lower basin $b$ which is situated nearest the sea and in front of the upper basin $a$. As the water rises further it opens the valves $a_1$ of the basin $a$ inwardly until the tide has reached its highest level, more water flowing in from the sea than is used by the turbine. When the ebb begins the inwardly-opening valves $a_1$ close and the basin $a$ now acts in its proper capacity as a reservoir for supplying the turbine. Some hours after the commencement of the ebb the exterior water will be at the same level as the water in the basin $b$; the valves $b_1$ will have opened outwardly and water will have flowed from the basin $b$ into the sea until the water has reached the lowest level of the ebb. The valves $b_1$ are then closed by the commencing flood, and the water which is utilized by the turbine collects in the basin $b$. While the basin $a$ is being gradually emptied the flood rises again so high that the basin $a$ is filled afresh. It is well-known to obtain continuous working as above described. Now when abnormal conditions of tide occur I prevent the efficiency of the plant from being diminished and the turbine from being flooded by connecting the auxiliary basin $f$ by one or more tubes $g$ with the lower basin $b$. The mouths of the tubes $g$ in the lower basin $b$ are at such a height that under normal conditions they are not reached by the water in the basin. When abnormal conditions occur the basin *b* can fill up to the mouths of the tubes and then the auxiliary basin *f* automatically takes over the function of collecting that quantity of waste water which the lower basin *b* must not receive in order that the plant may continue to operate continuously normally with the same head.

The one or more tubes *g* are built in the walls of the basins in such manner that the inflow of water into the basin *a* is not impeded. The water collected in the auxiliary basin *f* is let out into the sea during ebbtide by means of suitable outwardly-opening valves $f_1$.

I claim:—

In tidal hydraulic power plant of the character described, the combination, with an upper basin or reservoir having inwardly-opening valves, a lower basin having outwardly-opening valves, and a shaft, containing a prime mover, between and opening into said basins, of an auxiliary basin having outwardly-opening valves, and one or more tubes opening into said lower basin for supplying water therefrom into said auxiliary basin, the mouth or mouths of said one or more tubes in the lower basin being located at the highest point thereof to which water may rise for maintaining a constant head.

In testimony whereof, I affix my signature in the presence of two witnesses.

AUGUST HANSS.

Witnesses:
HENRY HASPER,
WOLDEMAR HAUPT.